Patented Feb. 15, 1938

2,108,768

UNITED STATES PATENT OFFICE 2,108,768

COATING COMPOSITIONS

Ernst Helft, Berlin-Halensee, Germany, assignor to American Hyalsol Corporation, Wilmington, Del., a corporation of Delaware No Drawing. Application February 1, 1933, Serial No. 654,771. In Germany February 3, 1932

3 Claims. (Cl. 134—79)

The present invention relates to paints, varnishes, lacquers and the like and has for an object to improve the dispersion of dyes, pigments, lamp black and other materials added during the compounding of the composition.

Another object is to provide an improved liquid coating material wherein the tendency of the suspended material including the coloring matter and loading material to separate out or coalesce is reduced.

In the production of paints, varnishes, lacquers and many other compositions in which pulverulent material is suspended in a liquid it is important that such pulverulent material be uniformly dispersed throughout the composition and, furthermore, that it be maintained in such dispersed condition against the usual tendency for it to settle out or to coalesce and form lumps. I have discovered that the dispersion of pulverulent material including various dry powders can be much improved and the dispersed condition can be maintained by the addition of higher molecular aliphatic alcohols containing, for example, more than 8 carbon atoms to the molecule or naphthenic alcohols as dispersion agents. The high molecular alcohols of the series containing 8 to 30 carbon atoms, especially those of even number, are now relatively well-known, the higher members of the series having more than 30 carbon atoms with few exceptions are not known and apparently are not easily produced. I prefer for this purpose to use the aliphatic mono-valent saturated or unsaturated alcohols having from 12 to 18 carbon atoms in the molecule. Myristyl cetyl, oleyl and stearyl alcohols have given particularly satisfactory results. The compounds of these alcohols including especially their esters with mono-valent aliphatic acids containing 8 or more carbon atoms to the molecule, for example cetylpalmitate, may also be effectively used. A small proportion of the higher molecular alcohol is sufficient to provide the desired dispersion. The optimum percentage varies with the conditions, but ordinarily 1 to 2% of the total mass of dry powder to be dispersed provides satisfactory results. In many cases satisfactory results are obtained if even less alcohol is used, for example, 0.5% of the weight of the dry powder or pulverulent material to be dispersed.

It is one of the advantages of the invention that the alcohols when used as indicated are stable and do not decompose or become rancid Preferably the high molecular alcohol and the dry materials are combined with each other and thoroughly mixed before the liquid material is combined therewith.

EXAMPLE 1

Brown oil-varnish for floors

To about 1,000 parts by weight molten colophonium which was hardened with about 7% calcium hydrate, 700 parts by weight wood-oil-varnish are added, which is obtained by heating up equal parts of linseed oil and wood-oil to 200° C. After cooling down one dilutes with 1,400 parts by weight turpentine and 280 parts by weight gasoline. Then 140 parts by weight siccative of lead and 40 parts ocher mixed with 1% oleyl-alcohol are added.

EXAMPLE 2

White enamel-lacquer for slab-irons

| | |
|---|---|
| 600 | parts by weight of nitro-cellulose and |
| 200 | parts by weight of adipic acid-dimethyl-cyclohexyl-ether | are diluted in

| | |
|---|---|
| 800 | parts by weight of ethyl-acetate |
| 400 | parts by weight of butyl-acetate |
| 200 | parts by weight of butyl-alcohol |
| with 1000 | parts by weight of toluene and |
| 400 | parts by weight of benzene. |

Thereupon

| | |
|---|---|
| 200 | parts by weight of dammar-dilution in benzene (1:1) |
| 200 | parts by weight of shellac-dilution in ethyl-alcohol (2:3) |
| 400 | parts by weight of zinc oxide |
| 225 | parts by weight of titanium oxide containing |
| 6½ | parts by weight of dodecyl alcohol | are added under stirring.

EXAMPLE 3

Black asphalt-varnish for bicycles

| | |
|---|---|
| 200 | parts by weight of syrian asphalt |
| 50 | parts by weight of rosin |
| 20 | parts by weight of carbon black to which are added |

0.4 part by weight of cetyl alcohol is solved in

| | |
|---|---|
| 250 | parts by weight of turpentine and |
| 250 | parts by weight of gasoline. |

The foregoing particular description is illustrative merely and not intended as defining the limits of the invention.

I claim:

1. A liquid coating composition comprising, in combination, nitro-cellulose, ethyl acetate, pulverulent material and a small proportion of dodecyl alcohol.

2. A liquid coating composition comprising, in combination, nitro-cellulose, an organic liquid carrier, pulverulent material and an aliphatic alcohol having from 8 to about 18 carbon atoms in the molecule for uniformly dispersing the pulverulent material throughout the liquid carrier, the quantity of alcohol being about 0.5 to 2% of the quantity of the pulverulent material by weight.

3. A liquid coating composition comprising, in combination, nitro-cellulose, an organic liquid carrier, pulverulent material and an aliphatic alcohol having from 12 to 18 carbon atoms in the molecule for uniformly dispersing the pulverulent material throughout the liquid carrier, the quantity of alcohol being about 0.5 to 2% of the quantity of the pulverulent material by weight.

ERNST HELFT.